Patented Feb. 20, 1951

2,542,812

UNITED STATES PATENT OFFICE 2,542,812

PREPARATION OF AMINOACIDAMIDES

Walter H. Hartung, Chapel Hill, N. C.

No Drawing. Original application April 3, 1946, Serial No. 659,439. Divided and this application October 9, 1948, Serial No. 53,750

3 Claims. (Cl. 260—558)

This invention relates to alpha-alkoximino acids and functional derivatives thereof and to procedure for preparing the same.

It is a primary object of this invention to produce compounds which are useful for the introduction of alpha-amino acid residues into compounds containing hydroxy, primary amino, or secondary amino groups.

One of the particular objects of my invention is the provision of compounds which are valuable intermediates for the synthesis of peptides.

The present invention comprises: preparing an alpha-alkoximino acid having the formula $R-C(:N-O-R_1)-CO-OH$, where R and $R_1$ are alkyl or aralkyl radicals, by alkylating an alpha-oximino acid having the formula $$R-C(:N-OH)-CO-OH$$

and converting said alpha-alkoximino acid into its functional derivatives, such as the acid halides, acid amides and esters. The alkoximino group in these compounds is converted into an amino group by catalytic hydrogenation.

As the starting materials in my process, there can be employed alpha-oximino acids having the formula $R-C(:N-OH)-CO-OH$ wherein R is, for example, methyl, isopropyl, n-butyl, isobutyl, benzyl, or a benzyl group substituted by methylenedioxy, alkoxyl or any other group convertible to hydroxy. These acids are readily obtained by the method of Hamlin and Hartung (J. Biol. Chem., 145, 349 (1942)).

The alkylation step in my process can be carried out conveniently by employing as the alkylating agent an ester of an alcohol with a strong acid, e. g., methyl bromide, ethyl chloride, methyl sulfate, ethyl sulfate, butyl p-toluenesulfonate, ethyl methanesulfonate, benzyl chloride, etc., in the presence of an alkali, such as sodium hydroxide or potassium hydroxide. In general, I have found that it is advantageous to use about five equivalents of the alkylation ester for each equivalent of alpha-oximino acid.

The conversion of the alpha-alkoximino acids into the corresponding alpha-alkoximino acid halides can be carried out by employing reagents generally used for preparing acyl halides from acids, e. g. halides of strong acids, such as phosphorus pentachloride, phosphorus trichloride, phosphorus oxychloride, thionyl chloride, thionyl bromide, etc. Because of the greater ease of isolation of the desired product when thionyl chloride is used, I prefer to use this reagent in practicing my invention. In the preparation of the alpha-alkoximino acid chlorides of lower molecular weight, e. g. the methoximino and ethoximino compounds, I have found that better yields are obtained when the reaction is carried out in the presence of a suitable non-reactive solvent such as anhydrous benzene.

My new alpha-alkoximino acid halides react readily with alcohols and phenols to form esters and with ammonia, primary amines, and secondary amines to form the corresponding amides, as illustrated by the following equations, wherein $R_4$ is a hydrocarbon radical, and $R_2$ and $R_3$ are each selected from the class consisting of hydrogen, hydrocarbon radicals, and substituted hydrocarbon radicals:

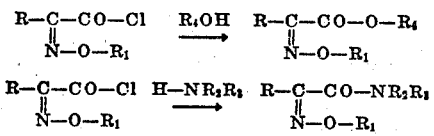

For the hydrogenation of the alpha-alkoximino compounds, I prefer to use a noble metal or nickel catalyst such as palladium, platinum, Raney nickel, etc. The conditions of hydrogen pressure, temperature, solvent, nature of the catalyst, etc. will, of course, markedly affect the rate of the reaction. I have found that, under similar reaction conditions, the benzyloximino group is more rapidly converted to the amino group than is a smaller alkoximino group such as ethoximino. For this reason, if the alkoximino group is ultimately to be converted to an amino group it is advantageous to employ a benzylating agent in the alkylation step of my process.

Because of the susceptibility of the alkoximino group in these compounds to catalytic hydrogenation to yield an amino group, my invention is particularly adapted to the solution of the problems of peptide synthesis. The preparation of synthetic peptides has become an important tool in the study of the physical and chemical properties of proteins and also in the study of proteolytic enzymes. Although there are available a number of procedures for obtaining synthetic peptides, each of these procedures suffers one or more drawbacks such as the use of difficultly available starting materials, the presence of decomposition products in the desired peptide, and lack of certainty as to the manner of linkage or sequence of the component amino acid residues.

The alpha-alkoximino acid halides react with alpha-amino acids to form amides which are converted by catalytic hydrogenation to dipeptides, in accordance with the following equations, wherein R is alkyl or aralkyl and Y is the hydrocarbon or substituted hydrocarbon residue of an alpha-amino acid.

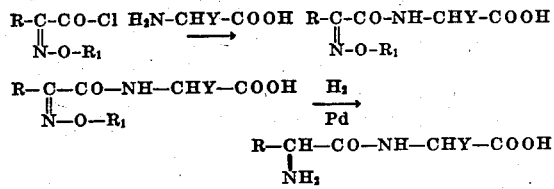

The dipeptides obtained in accordance with my invention have definite known structures and the products are free from decomposition by-products, as contrasted with products of many of the previously known processes.

My invention is illustrated by the following examples without, however, being limited thereto.

Example 1

A. 17.9 g. of alpha-oximino-beta-phenylpropionic acid are dissolved in a mixture of 100 ml. of 5% aqueous sodium hydroxide solution and 50 ml. of acetone in a 500 ml. three-neck flask on a water bath. To the solution there are separately added dropwise with stirring 100 ml. of diethyl sulfate and 100 ml. of aqueous sodium hydroxide solution containing 30.5 g. of sodium hydroxide, the two liquids being added, after the initial addition of a 10 ml. portion of the alkali solution, simultaneously and at approximately equal rates over a period of about thirty minutes. During this addition period the temperature of the water bath is slowly raised to 70° C. After this addition is completed, the reaction mixture is boiled under reflux for thirty minutes and, after removal of the reflux condenser, is further boiled for about an hour to remove the acetone. The reaction mixture is then cooled and is made definitely acid to Congo red paper by adding 25 ml. of concentrated hydrochloric acid. The acidified solution is extracted with ether several times and the combined extracts are washed with a few small portions of water and then dried over anhydrous sodium sulfate. The solvent is removed from the extract by distillation and the residue is distilled at 1–2 mm. pressure. The desired product, alpha-ethoximino - beta - phenylpropionic acid, distills at 115–120° C. and solidifies to colorless crystals, M. P. 58.5–59.0° C. The yield is about 16.3 g.

B. To 6.6 g. of alpha-ethoximino-beta-phenylpropionic acid in a 125 ml. flask 6.6 g. of thionyl chloride are added and the mixture is refluxed for thirty minutes. To the cooled reaction mixture is then added 100 ml. of benzene and the solution is distilled under reduced pressure. The fraction distilling at 95–97° C. at 1–2 mm. pressure is collected. This product, which is alpha-ethoximino - beta - phenylpropionyl chloride, weighs 6.0 g.

C. 9.2 g. of alpha-ethoximino-beta-phenylpropionyl chloride are dissolved in 25 ml. of dry benzene and to this solution is added a solution of 9.2 g. of aniline in 25 ml. of dry benzene. The mixture is refluxed on the steam bath for half an hour and the reaction mixture is then cooled. The aniline hydrochloride which precipitates is removed by filtration and the benzene is removed from the filtrate by distillation under reduced pressure. The distillation residue is dissolved in 20 ml. of anhydrous ethyl ether and to this solution is added 80 ml. of petroleum ether. Any precipitate which appears at this point (which consists of a salt of aniline with alpha-ethoximino-beta-phenylpropionic acid) is removed by filtration and the ethereal filtrate is evaporated to dryness. The residue is recrystallized from ethanol-water. The purified product, alpha-ethoximino-beta-phenylpropionanilide, consists of 5.8 g. of colorless crystals, M. P. 59–60° C. On hydrogenation in the presence of a palladium-on-charcoal catalyst, phenylalanylanilide is formed.

D. 3.0 g. of alpha-ethoximino-beta-phenylpropionyl chloride are added to 10 ml. of anhydrous ethyl alcohol and the mixture is refluxed on a steam bath for thirty minutes. The excess alcohol is then removed by distillation under reduced pressure. The residue is dissolved in ether, and this solution is washed with several small portions of saturated sodium chloride solution. The ethereal solution is dried over anhydrous sodium sulfate and is filtered. The filtrate is distilled at 1–3 mm. pressure and the fraction distilling at 118–120° C., which is ethyl alpha-ethoximino-beta-phenylpropionate, is collected. This ester is a clear, colorless liquid.

Example 2

When 11.7 g. of alpha-oximino-butyric acid are ethylated by the procedure of Example 1, there are obtained 8.6 g. of alpha-ethoximino-butyric acid, which distills from the reaction mixture residue at 89–95° C. at 12–14 mm. pressure and which solidifies to long, colorless needles melting at 61.0–61.5° C. Treatment of this acid with thionyl chloride yields alpha-ethoximino-butyryl chloride, which distills at 50–55° C. at 15–18 mm. pressure.

Example 3

When 29 g. of alpha-oximinohexanoic acid is ethylated by the procedure of Example 1, there are obtained 28.1 g. of alpha-ethoximinohexanoic acid, which distills from the reaction mixture residue at 83–88° C. at 1–3 mm. pressure and which solidifies to long, colorless needles melting at 23° C. By treatment with thionyl chloride this acid is converted to alpha-ethoximino-hexanoyl chloride, which distills at 170–175° C. at 1–2 mm. pressure.

This acid chloride can be reacted with valine, or other amino acid, to give an amide which yields on catalytic hydrogenation the corresponding dipeptide.

Example 4

A. 9.0 g. of alpha - oximino - beta - phenyl - propionic acid is placed in a 500 ml. three-neck flask with a mixture of 100 ml. of acetone and a solution of 2.5 g. of sodium hydroxide in 25 ml. of water. The mixture is warmed to 40° C. on a water bath and to the mixture is added dropwise, with stirring, 30 ml. of benzyl chloride and 30 ml. of aqueous sodium hydroxide solution containing 34.7 g. of sodium hydroxide, the two liquids being added, after the initial addition of a 5 ml. portion of the alkali solution, simultaneously and at approximately equal rates over a period of about thirty minutes. During this addition period the temperature of the water bath is slowly raised to 70° C. After the addition is complete, the reaction mixture is heated with continued stirring at 70° C. under reflux for an hour. The reflux condenser is then removed, the water bath is raised to boiling temperature, and the reaction mixture is heated for two hours. During the latter portion of the heating period, a current of air is drawn over the mixture and several small portions of water are added to prevent the mixture from solidifying. The mixture is then cooled and is extracted with several portions of ether. The solvent is evaporated from the ethereal solution and the semi-solid residue is washed with a small amount of anhydrous ether. There is thus obtained as a colorless solid 10.3 g. of sodium alpha - benzyloximino - beta - phenylpropionate. Acidification of an aqueous solution of this product and recrystallization of the precipitated solid yields 7.5 g. of crystalline alpha-benzyloximino-beta-phenylpropionic acid, M. P. 79–80° C.

B. A solution of 6.6 g. of thionyl chloride in 15 ml. of anhydrous benzene is added to a solution of 5.0 g. of alpha-benzyloximino-beta-phenyl-propionic acid and the mixture is heated under reflux for two hours. To the reaction mixture are then added 100 ml. of anhydrous benzene, the excess thionyl chloride and the benzene are removed by evaporation under reduced pressure, and the resulting residue is distilled. The desired product, alpha-benzyloximino-beta-phenyl-propionyl chloride, distills at 170–175° C. at 1–2 mm. pressure.

C. To a solution of 1.1 g. of alpha-benzyl-oximino-beta-phenyl-propionyl chloride in 25 ml. of anhydrous ether is added a solution of 0.8 g. of aniline in 10 ml. of anhydrous ether. The mixture is allowed to stand for an hour and the precipitate of aniline hydrochloride which forms is removed by filtration. The ether is removed from the filtrate by evaporation under diminished pressure and the resulting residue is recrystallized from ethanol-water. There is thus obtained 1.2 g. of alpha-benzyloximino-beta-phenylpropion-anilide, M. P. 73.5–74.0° C.

Instead of using aniline in part C, above, substituted anilines such as p-chloroaniline or p-anisidine may be used.

*Example 5*

When 7.2 g. of alpha-oximinohexanoic acid are benzylated by the procedure of Example 4, there are obtained 4.8 g. of alpha-benzyloximino-hexanoic acid, which is a white, crystalline solid melting at 61.0–61.5° C.

This application is a division of my copending U. S. Patent application S. N. 659,439, filed April 3, 1946 (now U. S. Patent 2,470,083).

I claim:

1. The process for preparing an alpha-amino acid amide which comprises: treating an alpha-oximinoether acid having the formula $$R-C(:N-O-R_1)-COOH$$

where R and $R_1$ are each selected from the group consisting of alkyl radicals and aralkyl radicals, with a halide of a strong inorganic acid, thus forming the corresponding alpha-oximinoether acid halide; treating said oximinoether acid halide with a primary amine; and catalytically hydrogenating the alpha - oximinoether acid amide thus obtained, thereby producing an alpha-amino acid amide.

2. The process for preparing an alpha-amino acid amide which comprises: treating an alpha-oximinoether acid having the formula $$Alkyl-C(:N-O-benzyl)-COOH$$

with thionyl chloride, thus forming the corresponding alpha-oximinoether acid chloride; treating said oximinoether acid chloride with a primary amine; and catalytically hydrogenating the alpha-oximinoether acid amide thus obtained, thereby producing an alpha-amino acid amide.

3. The process for preparing an alpha-amino acid amide which comprises: treating an alpha-oximinoether acid having the formula $$Aralkyl-C(:N-O-benzyl)-COOH$$

with thionyl chloride, thus forming the corresponding alpha-oximinoether acid chloride; treating said oximinoether acid chloride with a primary amine; and catalytically hydrogenating the alpha-oximinoether acid amide thus obtained, thereby producing an alpha-amino acid amide.

WALTER H. HARTUNG.

REFERENCES CITED

The following references are of record in the file of this patent:

Tilden et al.: "J. Chem. Soc." (London), vol. 87 (1905), p. 346.

Rendall et al.: "J. Chem. Soc." (London), vol. 121 (1922), pp. 2111–2119.

Adkins et al.: "J. Am. Chem. Soc.," vol. 60 (1938), pp. 1328–1330.